US011053414B2

(12) United States Patent
Yao

(10) Patent No.: US 11,053,414 B2
(45) Date of Patent: Jul. 6, 2021

(54) CUTTING PLOTTER FILM WITH ANTI-COUNTERFEIT EFFECT

(71) Applicant: Ming-Hsien Yao, Siansi Township (TW)

(72) Inventor: Ming-Hsien Yao, Siansi Township (TW)

(*) Notice: Subject to any disclaimer, the term of this patent is extended or adjusted under 35 U.S.C. 154(b) by 0 days.

(21) Appl. No.: 16/019,170

(22) Filed: Jun. 26, 2018

(65) Prior Publication Data

US 2018/0320030 A1   Nov. 8, 2018

Related U.S. Application Data

(63) Continuation-in-part of application No. 15/298,486, filed on Oct. 20, 2016, now abandoned.

(51) Int. Cl.
*C09J 7/25* (2018.01)
*B32B 3/26* (2006.01)
(Continued)

(52) U.S. Cl.
CPC ............ *C09J 7/25* (2018.01); *B32B 3/263* (2013.01); *B32B 7/06* (2013.01); *B32B 27/08* (2013.01);
(Continued)

(58) Field of Classification Search
CPC ....... C09J 7/25; C09J 7/29; C09J 7/255; C09J 2475/00; C09J 2467/006; C09J 2427/006; C09J 2423/106; C09J 2203/338; C09J 2201/61; C09J 2477/00; C09J 2475/006; G09F 3/04; G09F 2003/0282; G09F 2003/0277; B32B 27/08; B32B 7/06; B32B 3/263; B32B 2405/00; Y10T 428/24521; Y10T 428/24612

See application file for complete search history.

(56) References Cited

U.S. PATENT DOCUMENTS

2010/0203278 A1*  8/2010  Wu ............................. C09J 7/29
                                                                       428/40.1
2015/0217532 A1*  8/2015  Kuraseko ................ B32B 27/00
                                                                       156/230

FOREIGN PATENT DOCUMENTS

EP           0492571 A1 *  7/1992  ............ B41M 5/035
EP           3 305 544 A1     4/2018
(Continued)

OTHER PUBLICATIONS

[NPL-1] Liou et al. (TW M346528 U) (Dec. 2008); (machine translation). (Year: 2008).*

*Primary Examiner* — David Sample
*Assistant Examiner* — Donald M Flores, Jr.
(74) *Attorney, Agent, or Firm* — Guice Patents PLLC

(57) ABSTRACT

A cutting plotter film with anti-counterfeit effect includes: a heat-resistant layer; a stripe-embossed layer having releasing property and bonded on the heat-resistant layer, the stripe-embossed layer being formed with a stripe-embossed surface; a character film layer disposed on the stripe-embossed surface of the stripe-embossed layer, having a contact surface in contact with the stripe-embossed surface, the contact surface being formed with anti-counterfeit stripes; and a heat bonding layer disposed on the character film layer. Figures/characters are cut/engraved on the character film layer and the heat bonding layer. The cutting plotter film is placed on a product and heated to transfer and adhere the figures/characters onto the product.

20 Claims, 10 Drawing Sheets

(51) Int. Cl.
  *B32B 7/06*   (2019.01)
  *B32B 27/08*  (2006.01)
  *G09F 3/04*   (2006.01)
  *C09J 7/29*   (2018.01)
  *G09F 3/02*   (2006.01)

(52) U.S. Cl.
  CPC ............... *C09J 7/255* (2018.01); *C09J 7/29* (2018.01); *G09F 3/04* (2013.01); *B32B 2405/00* (2013.01); *C09J 2203/338* (2013.01); *C09J 2301/304* (2020.08); *C09J 2423/106* (2013.01); *C09J 2427/006* (2013.01); *C09J 2467/006* (2013.01); *C09J 2475/00* (2013.01); *C09J 2475/006* (2013.01); *C09J 2477/00* (2013.01); *G09F 2003/0277* (2013.01); *G09F 2003/0282* (2013.01); *Y10T 428/24521* (2015.01); *Y10T 428/24612* (2015.01)

(56) References Cited

FOREIGN PATENT DOCUMENTS

| EP | 7184131.5   |   | 6/2018  |         |
|----|-------------|---|---------|---------|
| EP | 3 305 544 B1|   | 1/2019  |         |
| TW | 200431      |   | 2/1993  |         |
| TW | M346528     |   | 12/2008 |         |
| TW | M346528 U   | * | 12/2008 | ............... B44C 1/16 |
| TW | 201410460   |   | 3/2014  |         |
| TW | I598235     |   | 10/2016 |         |

* cited by examiner

CUTTING PLOTTER FILM WITH ANTI-COUNTERFEIT EFFECT

INCORPORATION BY REFERENCE

This application is a Continuation-In-Part currently pending application U.S. Ser. No. 15/298,486, entitled "CUTTING PLOTTER FILM WITH ANTI-COUNTERFEIT EFFECT" and filed on Oct. 20, 2016, and which is incorporated herein by reference in its entirety.

BACKGROUND OF THE INVENTION

1. Field of the Invention

The present invention relates generally to an attachment film, and more particularly to a cutting plotter film with anti-counterfeit design. The cutting plotter film is made with figures and characters transferable to a product. After the figures and characters are transferred to the product, the anti-counterfeit design enables a consumer to distinguish between a true product and a counterfeit product.

2. Description of the Related Art

There are various counterfeit and low-quality products on the market. Especially, with respect to those brands of products with high reputation, a great amount of counterfeit products are often resultantly manufactured. In case the market is flooded with the counterfeit products, it will be a great loss to both the consumers and the manufacturers. When a consumer incautiously buys a counterfeit product, it will cause money loss of the consumer. Moreover, in case the material of the counterfeit product is poor or has some defects, the counterfeit product may also be harmful to human health.

Silk screen printing is a kind of conventional printing technique for printing figures onto an article. In silk screen printing, it is necessary to manufacture halftones according to the figures to be printed. The more the colors of the figures are, the more the needed halftones are. Therefore, it costs more time to proof. Also, the plate-making cost is high and the proofing speed is slow and the figures can be hardly quickly changed or modified. Furthermore, the conventional silk screen printing cannot provide anti-counterfeit function so that it is easy to counterfeit the products.

In order to overcome the shortcoming of the conventional technique, the applicant provides a cutting plotter film with anti-counterfeit effect. The cutting plotter film is formed with anti-counterfeit stripes, which enable a consumer to truly distinguishing between a true product and a counterfeit product.

SUMMARY OF THE INVENTION

It is therefore a primary object of the present invention to provide a cutting plotter film with anti-counterfeit effect. The cutting plotter film can be adhered to a product for a consumer to distinguish between a true product and a counterfeit product. The cutting plotter film with anti-counterfeit effect of the present invention is an attachment film. The cutting plotter film is made with characters/figures transferable to the product. The characters/figures are designed with anti-counterfeit stripes. After the characters/figures are adhered to the product, the anti-counterfeit stripes are integrally transferred to the product for a consumer to distinguish between a true product and a counterfeit product.

It is a further object of the present invention to provide the above cutting plotter film with anti-counterfeit effect. The cutting plotter film is easy and fast to manufacture so that the manufacturing time is shortened and the manufacturing cost is lowered.

It is still a further object of the present invention to provide the above cutting plotter film with anti-counterfeit effect. The cutting plotter film is easy to manufacture and the characters/figures of the cutting plotter film can be quickly changed or modified.

To achieve the above and other objects, the cutting plotter film with anti-counterfeit effect of the present invention includes:

a heat-resistant layer, which is a heat-resistant film;

a stripe-embossed layer bonded on the heat-resistant layer and having releasing property, a surface of the stripe-embossed layer distal from the heat-resistant layer being embossed with stripes to form a stripe-embossed surface;

a character film layer disposed on the stripe-embossed surface of the stripe-embossed layer, the character film layer having a contact surface in contact with the stripe-embossed surface, the contact surface of the character film layer being formed with anti-counterfeit stripes; and a heat bonding layer disposed on the character film layer, when heated, the heat bonding layer becoming adhesive.

Preferably, figures and characters are cut/engraved on the cutting plotter film. The figures and characters are line profiles formed on the cutting plotter film. The cutting depth of the figures and characters at least reaches the character film layer and the heat bonding layer.

When heated, the character film layer is easy to separate from the stripe-embossed surface of the stripe-embossed layer. Also, when heated, the heat bonding layer becomes adhesive.

Accordingly, various figures and characters can be cut/engraved on the cutting plotter film by means of a digital cutting machine; alternatively, the figures and characters can be cut/engraved on the cutting plotter film by consumers themselves. After the unneeded parts are peeled off, the cutting plotter film becomes a transferable cutting plotter film. The cutting plotter film is placed on a product and heated. Thereafter, the figures and characters are adhered to the product. After the heat-resistant layer and the stripe-embossed layer are removed, the transfer of the figures and characters is completed. After transferred and bonded to the product, the figures and characters with the anti-counterfeit stripes enable a consumer to distinguish between a true product and a counterfeit product. The figures and characters transferred to the product are firmly adhered to the product and cannot be easily removed. In contrast, the conventional silk screen printing cannot provide anti-counterfeit function and when it is desired to modify the figures, it is necessary to re-make the plates. As a result, it is time-consuming and laborious to manufacture the product and the manufacturing cost is very high. The present invention eliminates all the shortcomings of the conventional silk screen printing.

The present invention can be best understood through the following description and accompanying drawings, wherein:

DETAILED DESCRIPTION OF THE PREFERRED EMBODIMENTS

Figure 1:
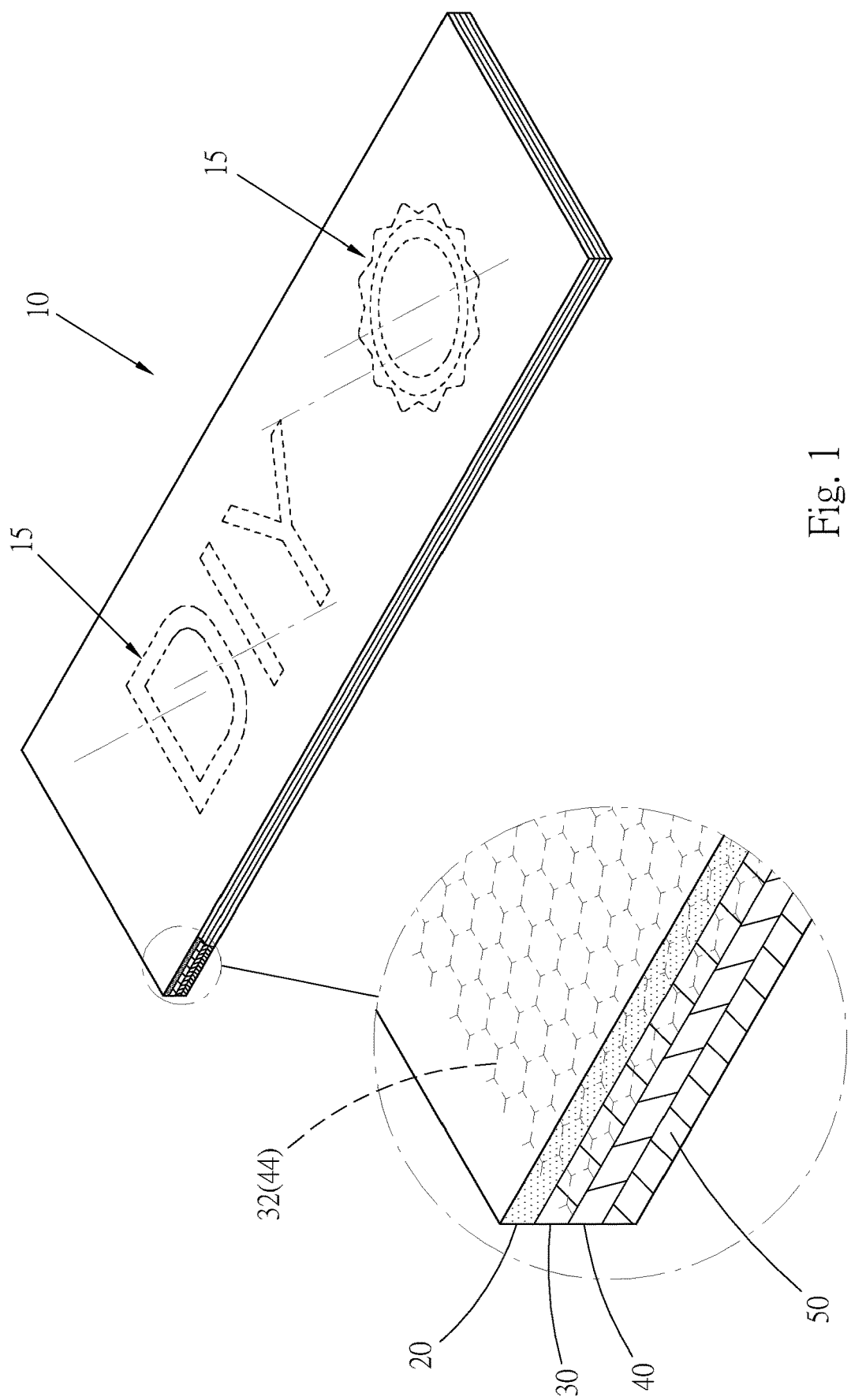
FIG. 1 is a top perspective view of a preferred embodiment of the cutting plotter film of the present invention and an enlarged view of circled area of the cutting plotter film.
Figure 2:
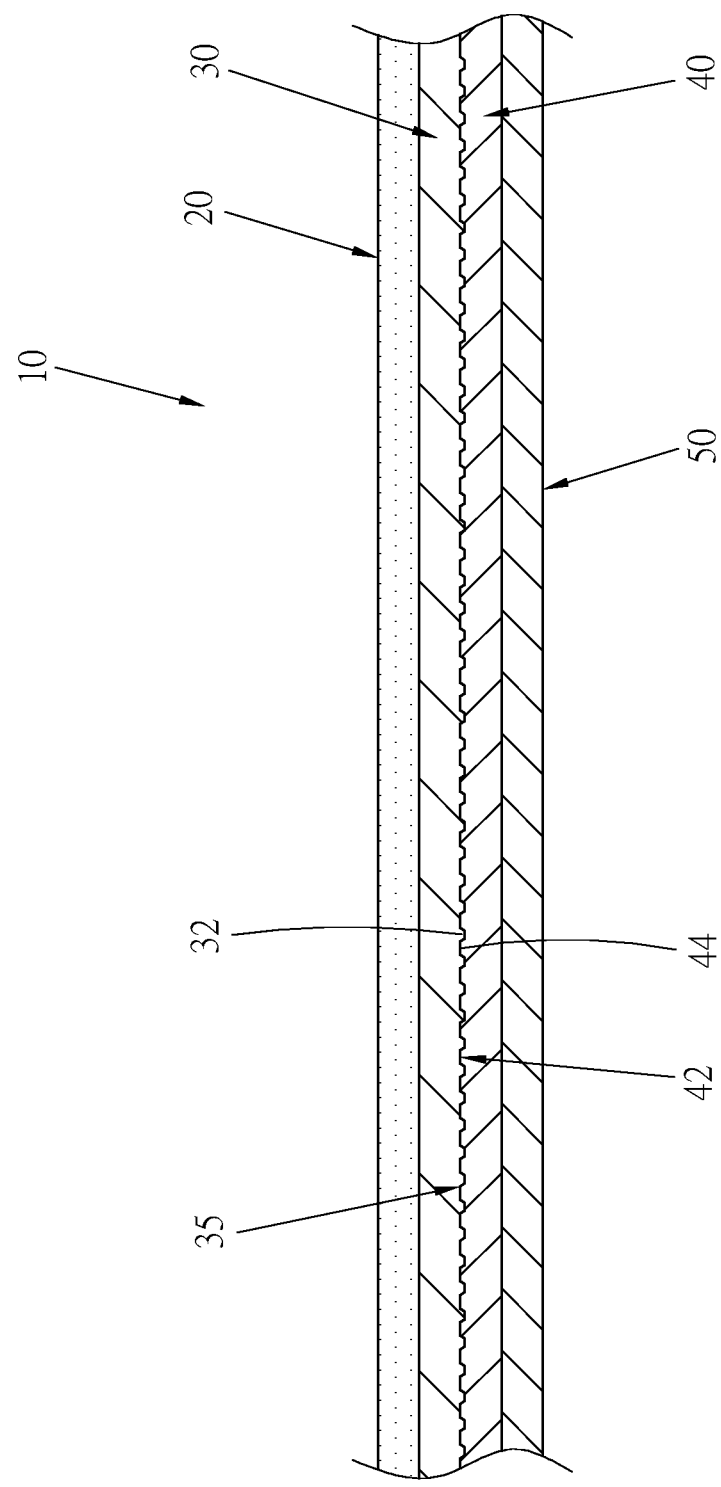
FIG. 2 is a high-magnification enlarged sectional view of the cutting plotter film of FIG. 1.
Figure 3:
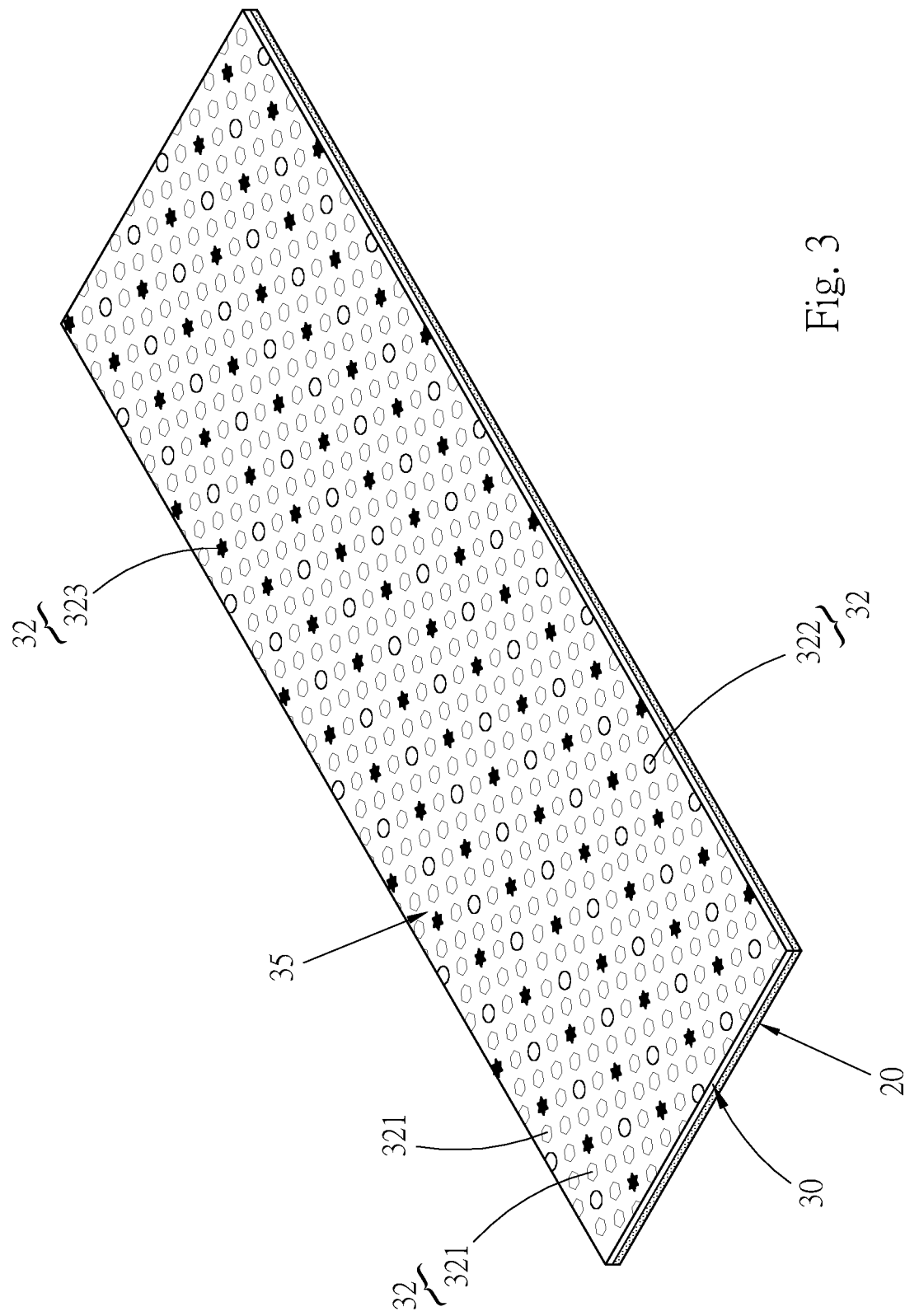
FIG. 3 is a bottom perspective view of the preferred embodiment of the cutting plotter film of the present invention, showing the heat-resistant layer and stripe-embossed layer thereof.

Please refer to FIGS. 1 and 2. According to a preferred embodiment, the cutting plotter film 10 with anti-counterfeit effect of the present invention serves as a manufacturing material for forming stripes on the surface of the leather product.

The cutting plotter film 10 is a laminate structure having a heat-resistant layer 20, a stripe-embossed layer 30, a character film layer 40 and a heat bonding layer 50.

The heat-resistant layer 20 is a heat-resistant plastic film, which at least is able to bear a temperature over 110° C., and preferably over 130° C. In this embodiment, the heat-resistant layer 20 is a polyethylene terephthalate (PET) film or an oriented polypropylene (OPP) film.

The stripe-embossed layer 30 is bonded with a surface of the heat-resistant layer 20 by means of an adhesive. The stripe-embossed layer 30 has releasing effect. In this embodiment, the stripe-embossed layer 30 is a cast polypropylene (CPP) film. Please refer to FIG. 2. The other surface of the stripe-embossed layer 30 is embossed with at least one kind of embossed stripes 32, whereby this surface of the stripe-embossed layer 30 forms a stripe-embossed surface 35. The processing temperature for forming the embossed stripes 32 on the stripe-embossed surface 35 ranges from 110° C. to 250° C., and preferably 130° C. to 220° C. The embossed stripes 32 can include a kind of stripes 321 or various stripes 321, 322, 323, which are different from each other in shape, form, stripe or size. The embossed stripes 32 on the stripe-embossed surface 35 can be regular or irregular or specifically designed stripes. The embossed stripes can be fully or locally or specially arranged on the stripe-embossed surface 35. The embossed stripes 32 can be formed by means of plate-making or laser engraving, for example, the embossed stripes are laser stripes. The embossed stripes 32 can be made with different structures and configurations by means of different manufacturing methods in accordance with different designs. These are not limited to the above embodiments.

The releasing effect of the stripe-embossed layer 30 can be achieved by its own material properties, (for example, the aforesaid CPP material). Alternatively, a composition with releasing effect can be added into the material of the stripe-embossed layer 30 to achieve the releasing effect. Alternatively, a release agent can be coated on the stripe-embossed surface 35 to achieve the releasing effect. The heat-resistant layer 20 and the stripe-embossed layer 30 can be first attached to each other and then the stripe-embossed surface 35 is processed. Alternatively, after the stripe-embossed layer 30 is embossed to form the stripe-embossed surface 35, the stripe-embossed layer 30 is attached to the heat-resistant layer 20.

The character film layer 40 is disposed on the stripe-embossed surface 35 of the stripe-embossed layer 30. In this embodiment, the character film layer 40 is a resin layer formed of plastic material such as polyurethane (PU) or polyvinyl chloride (PVC). The liquid-phase (paste material) polyurethane (PU) or polyvinyl chloride (PVC) is coated on the stripe-embossed surface 35 of the stripe-embossed layer 30 and shaped to form the character film layer 40. The character film layer 40 has a contact face in contact with the stripe-embossed surface 35. The character film layer 40 is coated on the stripe-embossed surface 35 so that the contact face of the character film layer 40 forms an anti-counterfeit surface 42 having at least one kind of anti-counterfeit stripes 44 corresponding to the embossed stripes 32, the anti-counterfeit stripes 44 are visible for identification. Accordingly, the anti-counterfeit stripes 44 are in mirror symmetry with respect to the embossed stripes 32 (the stripes 321, 322, 323).

The heat bonding layer 50 is disposed on the other surface of the character film layer 40. In this embodiment, the heat bonding layer 50 is a thermosol (hot melt adhesive) formed of plastic material such as polyurethane (PU), polyester (PES), thermoplastic polyurethane (TPU) or nylon. The heat bonding layer (thermosol) 50 can be bonded with the character film layer 40 in a coating manner. Alternatively, the heat bonding layer 50 can be a layer of thermosol film attached to the character film layer 40 by means of thermal attachment or an adhesive.

Figure 4:
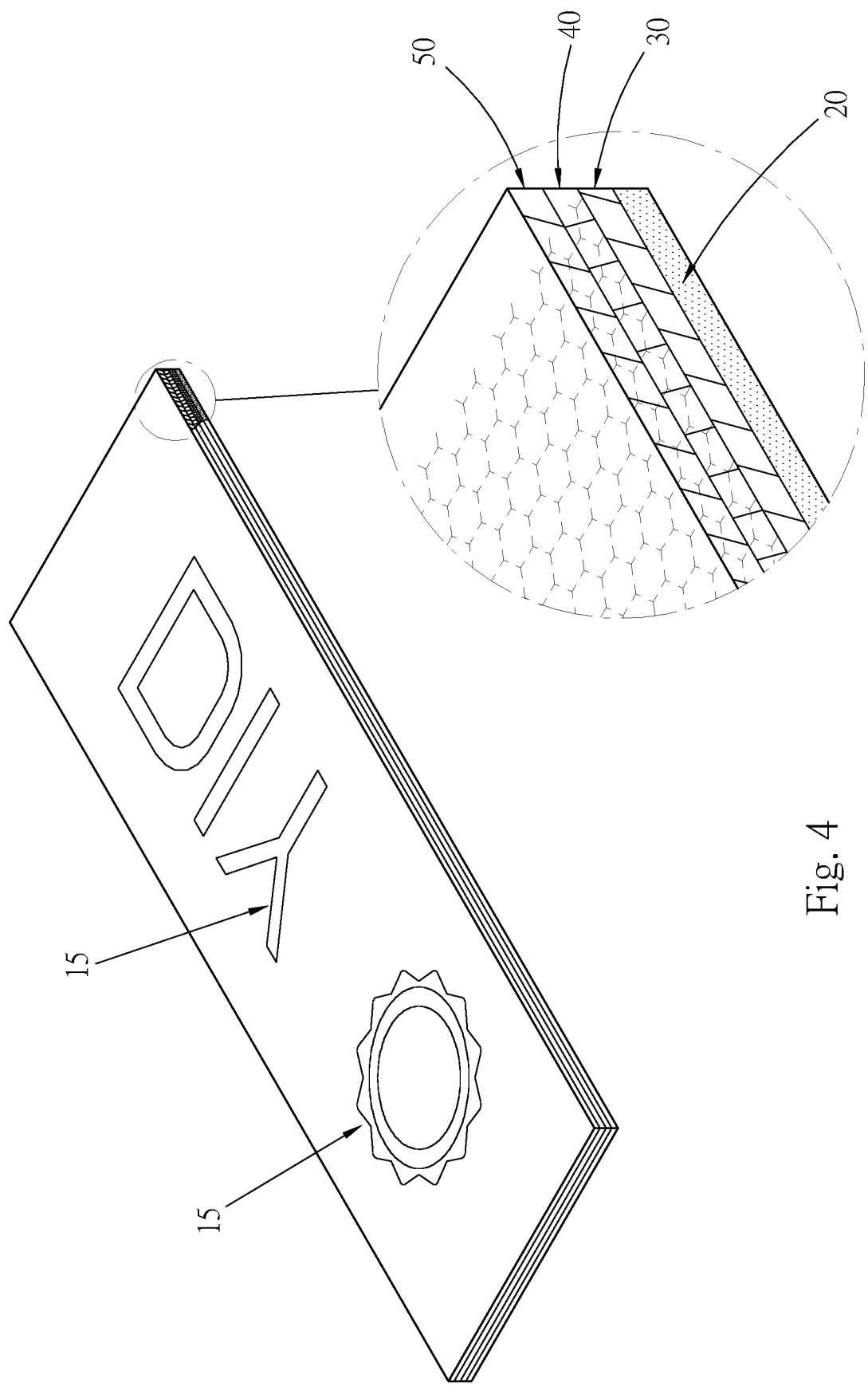
FIG. 4 is a reverse perspective view of the cutting plotter film of the present invention, showing that the cutting plotter film is cut with figures and characters.
Figure 6:
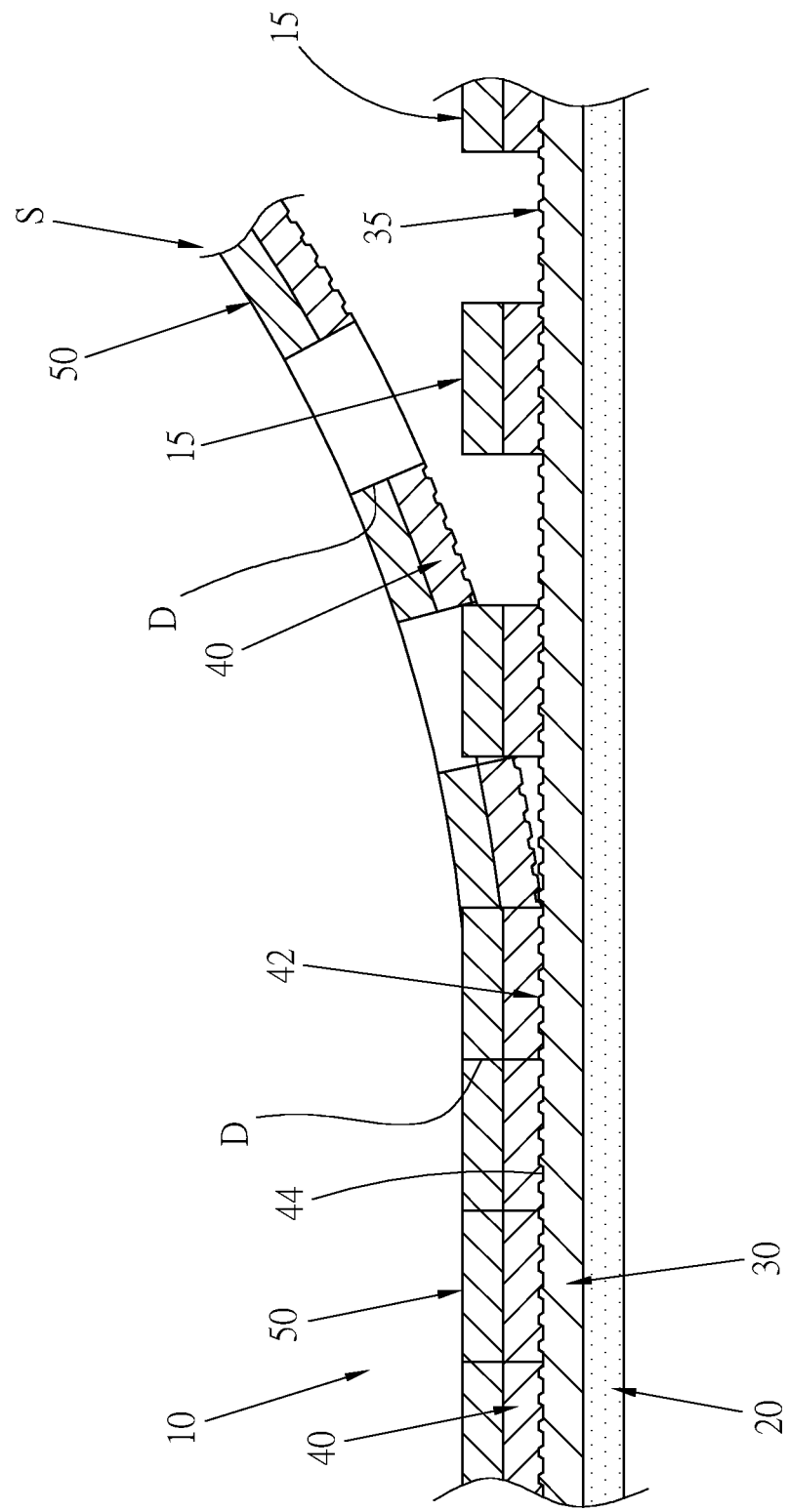
FIG. 6 is a sectional view according to FIG. 5.

After the cutting plotter film 10 is manufactured according to the aforesaid manufacturing method, it is necessary to further cut the cutting plotter film 10 into desired figures and characters (figures/characters). Please refer to FIG. 4. With the heat bonding layer 50 facing upward, the cutting plotter film 10 is cut and engraved to form the desired figures and characters 15 (figures, characters, symbols or a combination thereof). The figures and characters 15 are the profiles of the characters, figures, symbols and lines formed on the cutting plotter film 10 by cutting. When cutting the figures and characters 15, the cutting depth D only reaches the heat bonding layer 50 and the character film layer 40 without cutting the heat-resistant layer 20 and the stripe-embossed layer 30 (as shown in FIG. 6). The desired figures and characters 15 are designed with a computer and cut by means of a computerized apparatus (such as a digital cutting machine, an engraving machine or a laser engraving machine). Therefore, the figures and characters 15 are easy to design, change, cut and form. The figures and characters can be cut by consumers.

Figure 5:
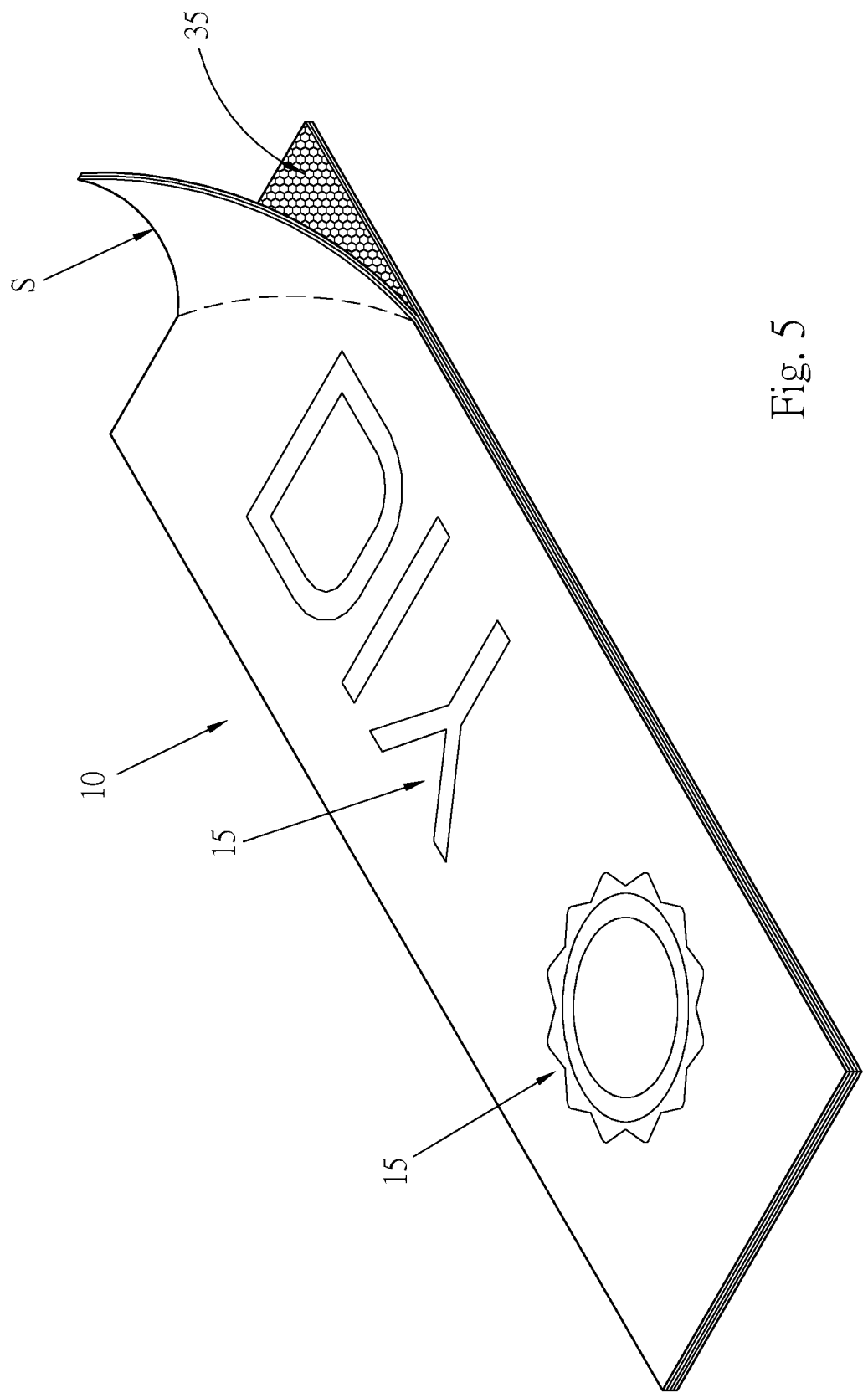
FIG. 5 is a perspective view according to FIG. 4, showing that after cut with the figures and characters, the unneeded parts of the cutting plotter film are peeled off.
Figure 7:
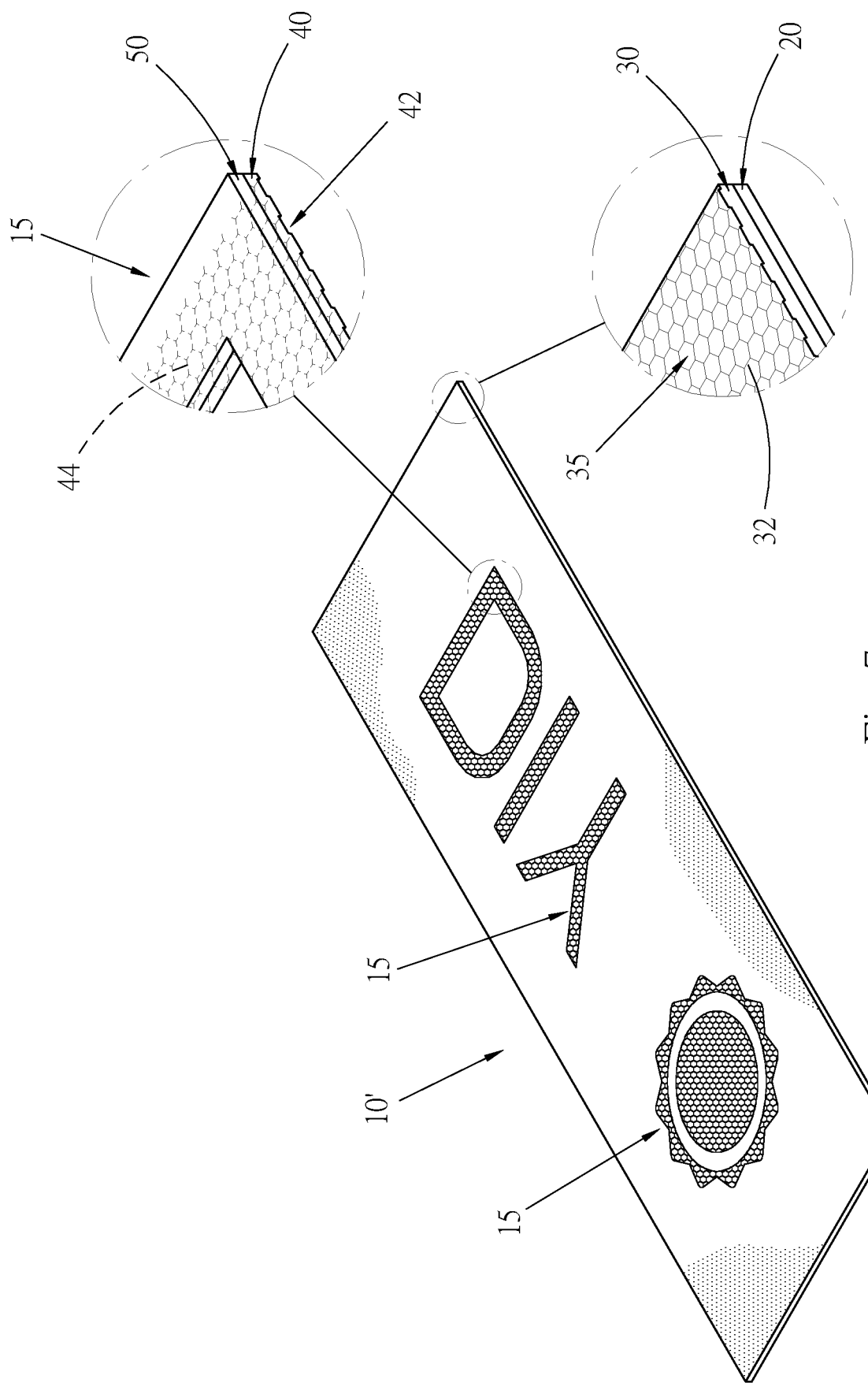
FIG. 7 is a perspective view of the transferable cutting plotter film of the present invention and enlarged views of circled areas of the transferable cutting plotter film.

After the figures and characters 15 are cut and formed, then, the unneeded parts S are peeled off to leave the figures and characters 15 as shown in FIGS. 5 and 6. The unneeded parts S are the parts other than the figures and characters 15. Please refer to FIG. 7. The remaining parts are the cut figures and characters 15. After the unneeded parts S are peeled off, the cutting plotter film 10 includes the heat-resistant layer 20, the stripe-embossed layer 30 and the remaining parts of the character film layer 40 and the heat bonding layer 50 that form the figures and characters 15. At this time, the cutting plotter film 10 becomes a cutting plotter film 10', which can be used for heat transfer process as shown in FIG. 7. The figures and characters 15 of the film 10' can be transferred to the surface of a product. The cutting plotter film 10 is simply different from the cutting plotter film 10' in whether the unneeded parts S are peeled off. It should be noted that FIG. 7 is an upside-down figure so that the figures and characters 15 are reverse characters or figures. Moreover, the heat-resistant layer 20 and the stripe-embossed layer 30 are preferably transparent or semitransparent. In this case, when watching the cutting plotter film 10' from the front side, an operator can see through the heat-resistant layer 20 and the stripe-embossed layer 30 to identify the cut figures and characters 15 of the character film layer 40.

Figure 8:
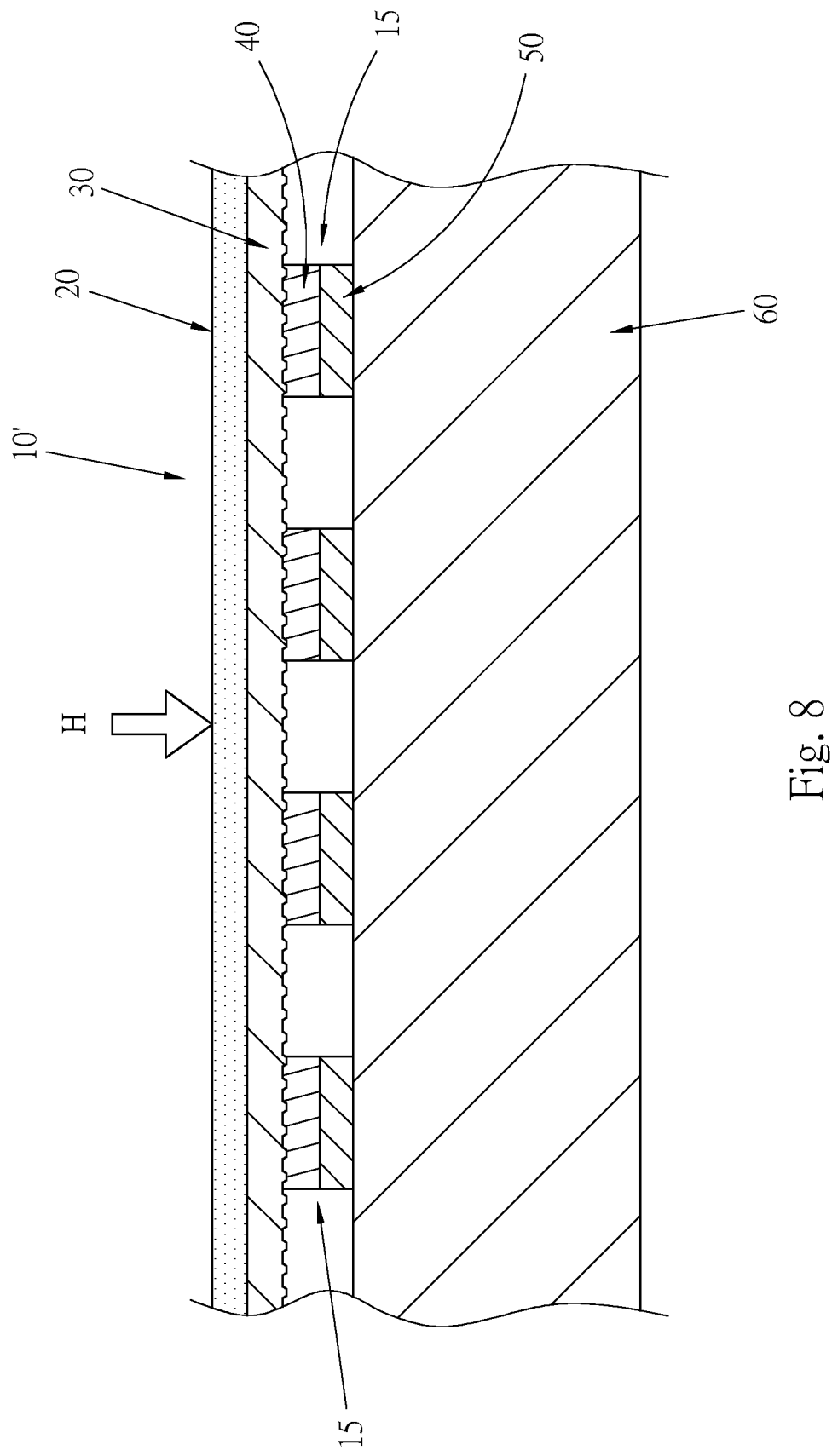
FIG. 8 is a sectional view showing that the figures and characters of the cutting plotter film of FIG. 7 are transferred onto a product.
Figure 9:
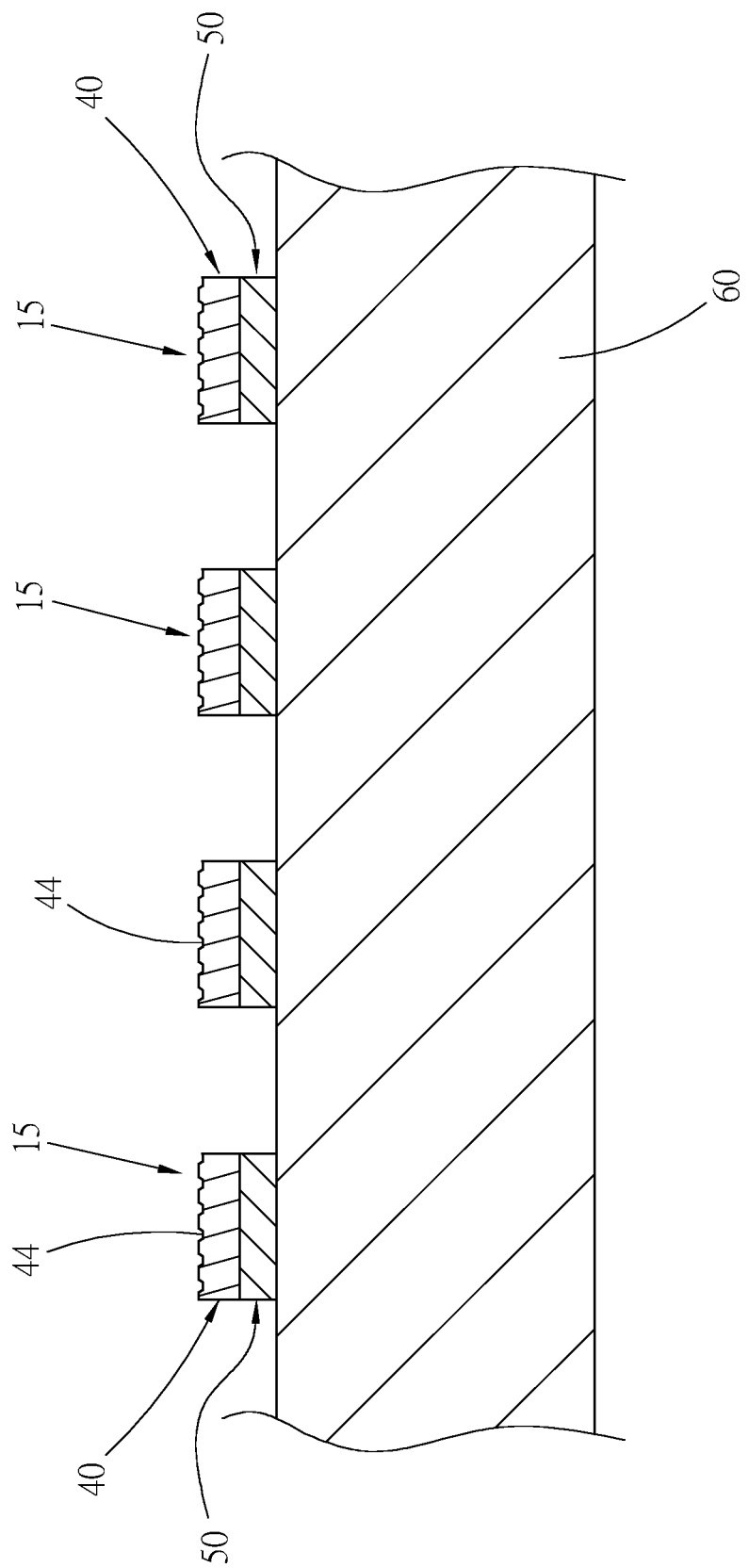
FIG. 9 is a sectional view according to FIG. 8, showing that the transfer of the figures and characters to the product is completed.
Figure 10:
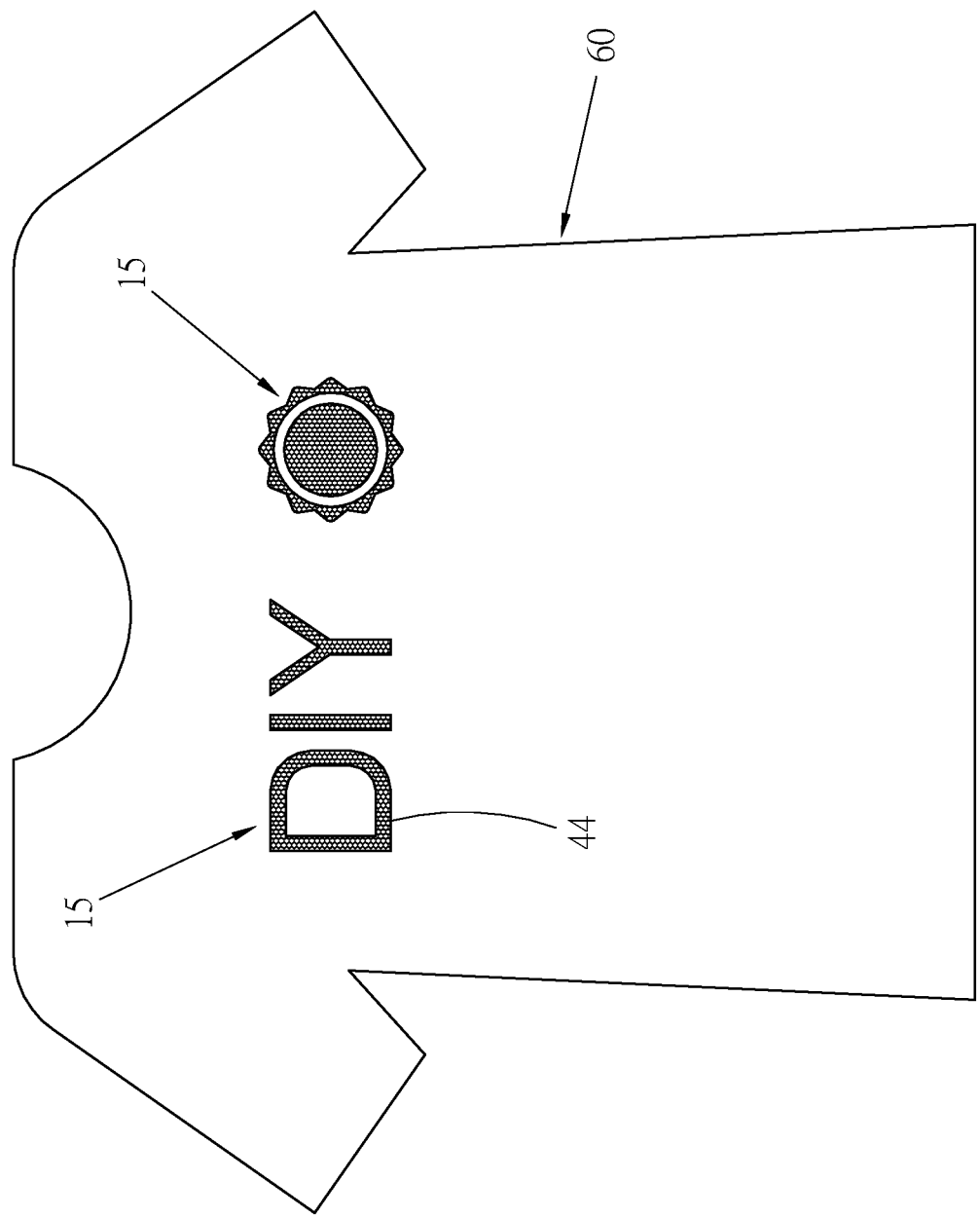
FIG. 10 is a front view of the product, showing that the figures and characters are transferred to the product.

When transferring the figures and characters 15 onto a product 60, the transferable cutting plotter film 10' is placed on the surface of the product 60 (such as a dress decoration, a dress, a clothes, a bag, a shoe and any other textile article or non-textile article) as shown in FIG. 8. The figures and characters 15 are in contact with the product 60 with the heat-resistant layer 20 facing outward. Then, a high-temperature apparatus such as an electrical iron or heat press machine is used to heat H the cutting plotter film 10'. The heating temperature ranges from 100° C. to 180° C., and preferably 110° C. to 170° C. Due to the high temperature, the heat bonding layer 50 of the figures and characters 15 becomes adhesive and the character film layer 40 is separated from the stripe-embossed layer 30 (this is because the stripe-embossed layer 30 has releasing property so that the character film layer 40 is easy to peel off from the stripe-embossed surface 35 of the stripe-embossed layer 30). By means of the heat bonding layer 50, the figures and characters 15 are firmly adhered to the surface of the product 60 as shown in FIG. 9. During the heating process, the cutting plotter film 10' can be also pressurized to make the figures and characters 15 more firmly bonded with the product 60. After the heat-resistant layer 20 and the stripe-embossed layer 30 are removed, the transfer and adhesion of the figures and characters 15 onto the product 60 are completed. FIG. 10 shows that the figures and characters 15 are transferred to the surface of the product (clothes) 60. After transferred, the figures and characters 15 are presented as front-side characters or figures.

Please refer to FIG. 10. The anti-counterfeit stripes 44 on the figures and characters 15 can provide anti-counterfeit effect for distinguishing between a true product and a counterfeit product. After transferred, the figures and characters 15 are firmly adhered to the product 60 and cannot be easily removed or torn off. In case anyone tries to counterfeit or modify the figures and characters 15, he/she must remove the transferred figures and characters 15. However, the figures and characters 15 are firmly adhered to and bonded with the product 60 so that when removing the figures and characters 15, the product 60 will be damaged as well.

The cutting plotter film with anti-counterfeit effect of the present invention is cut by digital design and digital cutting apparatus or by consumers to form various figures and characters. Therefore, plate-making is unneeded and the proofing is speeded. Furthermore, by means of the anti-counterfeit design, the shortcoming of the conventional silk-screen printing that it is easy to counterfeit the product can be thoroughly overcome. The anti-counterfeit design helps a consumer in more easily distinguishing between a true product and a counterfeit product.

The above embodiments are only used to illustrate the present invention, not intended to limit the scope thereof. Many modifications of the above embodiments can be made without departing from the spirit of the present invention.

What is claimed is:

1. A cutting plotter film with anti-counterfeit effect, comprising:
    a heat-resistant layer, which is a heat-resistant film;
    a stripe-embossed layer bonded on the heat-resistant layer, a surface of the stripe-embossed layer distal from the heat-resistant layer being embossed with stripes to form a stripe-embossed surface;
    a character film layer disposed on the stripe-embossed surface of the stripe-embossed layer, the character film layer having a contact surface in contact with the stripe-embossed surface, the contact surface of the character film layer being formed with an anti-counterfeit surface, the anti-counterfeit surface having visible anti-counterfeit stripes, the character film layer being releasable from the stripe-embossed layer; and
    a heat bonding layer disposed on the character film layer, when heated, the heat bonding layer becoming adhesive;
    wherein the heat-resistant layer is a plastic film, the stripe-embossed layer is a polypropylene film, the character film layer is a plastic material, and the heat bonding layer is a plastic material.

2. The cutting plotter film as claimed in claim 1, wherein figures/characters being cut/engraved on the cutting plotter film, the figures/characters being line profiles formed on the cutting plotter film, the cutting depth of the figures/characters at least reaching the character film layer and the heat bonding layer.

3. The cutting plotter film as claimed in claim 1, wherein the anti-counterfeit stripes include at least one form of stripes.

4. The cutting plotter film as claimed in claim 2, wherein the stripe-embossed layer and the heat-resistant layer are free of line profiles forming the figures/characters.

5. The cutting plotter film as claimed in claim 1, wherein after the stripe-embossed layer and the heat-resistant layer are bonded with each other, the stripe-embossed layer is embossed to form the stripe-embossed surface or after the stripe-embossed layer is embossed to form the stripe-embossed surface, the stripe-embossed layer is bonded with the heat-resistant layer.

6. The cutting plotter film as claimed in claim 1, wherein a processing temperature for forming the stripe-embossed surface of the stripe-embossed layer ranges from 110° C. to 250° C.

7. The cutting plotter film as claimed in claim 1, wherein the heat-resistant layer is a polyethylene terephthalate (PET) film or an oriented polypropylene (OPP) film and the stripe-embossed layer with releasing property is a cast polypropylene (CPP) film or a film having a composition with releasing property.

8. The cutting plotter film as claimed in claim 1, wherein a releasing agent is disposed between the stripe-embossed surface of the stripe-embossed layer and the character film layer.

9. The cutting plotter film as claimed in claim 1, wherein the character film layer is formed of polyurethane (PU) or polyvinyl chloride (PVC).

10. The cutting plotter film as claimed in claim 1, wherein the heat bonding layer is a thermosol formed of polyurethane (PU), polyester (PES), thermoplastic polyurethane (TPU) or nylon or a thermosol film.

11. A cutting plotter film with anti-counterfeit effect, comprising:

a heat-resistant layer, which is a heat-resistant film, the heat-resistant layer at least being able to bear a temperature over 110° C. and up to a processing temperature of 250° C.;

a stripe-embossed layer bonded on the heat-resistant layer, a surface of the stripe-embossed layer distal from the heat-resistant layer being embossed with stripes to form a stripe-embossed surface;

a character film layer disposed on the stripe-embossed surface of the stripe-embossed layer, the character film layer having a contact surface in contact with an anti-counterfeit surface, the anti-counterfeit surface having the stripe-embossed surface, the contact surface of the character film layer being formed with visible anti-counterfeit stripes, the character film layer being releasable from the stripe-embossed layer; and a heat bonding layer disposed on the character film layer, when heated, the heat bonding layer becoming adhesive;

wherein the heat-resistant layer is a plastic film, the stripe-embossed layer is a polypropylene film, the character film layer is a plastic material, and the heat bonding layer is a plastic material.

12. The cutting plotter film as claimed in claim 11, wherein figures/characters being cut/engraved on the cutting plotter film, the figures/characters being line profiles formed on the cutting plotter film, the cutting depth of the figures/characters at least reaching the character film layer and the heat bonding layer;

the parts of the heat bonding layer and the character film layer that are other than the figures/characters being unneeded parts, the unneeded parts being peeled off from the cutting plotter film.

13. The cutting plotter film as claimed in claim 12, wherein the stripe-embossed layer and the heat-resistant layer are free of line profiles forming the figures/characters.

14. The cutting plotter film as claimed in claim 11, wherein the anti-counterfeit stripes include at least one form of stripes.

15. The cutting plotter film as claimed in claim 11, wherein after the stripe-embossed layer and the heat-resistant layer are bonded with each other, the stripe-embossed layer is embossed to form the stripe-embossed surface or after the stripe-embossed layer is embossed to form the stripe-embossed surface, the stripe-embossed layer is bonded with the heat-resistant layer.

16. The cutting plotter film as claimed in claim 11, wherein the processing temperature for forming the stripe-embossed surface of the stripe-embossed layer ranges from 110° C. to 250° C.

17. The cutting plotter film as claimed in claim 11, wherein the heat-resistant layer is a polyethylene terephthalate (PET) film or an oriented polypropylene (OPP) film and the stripe-embossed layer with releasing property is a cast polypropylene (CPP) film or a film having a composition with releasing property.

18. The cutting plotter film as claimed in claim 11, wherein a releasing agent is disposed between the stripe-embossed surface of the stripe-embossed layer and the character film layer.

19. The cutting plotter film as claimed in claim 11, wherein the character film layer is formed of polyurethane (PU) or polyvinyl chloride (PVC).

20. The cutting plotter film as claimed in claim 11, wherein the heat bonding layer is a thermosol formed of polyurethane (PU), polyester (PES), thermoplastic polyurethane (TPU) or nylon or a thermosol film.

* * * * *